United States Patent [19]
Arnedo et al.

[11] Patent Number: 6,049,070
[45] Date of Patent: Apr. 11, 2000

[54] ELECTRIC TOASTER WITH INFRARED DETECTOR CROSS REFERENCE TO RELATED APPLICATION

[75] Inventors: Julian Arnedo; Antonio Basora Sanjuan, both of Barcelona, Spain

[73] Assignee: Moulinex S.A., Paris, France

[21] Appl. No.: 09/118,862

[22] Filed: Jul. 20, 1998

[51] Int. Cl.$^7$ .................................................. H05B 1/02
[52] U.S. Cl. .................... 219/502; 518/519; 518/492; 99/329 R
[58] Field of Search .................... 219/494, 497, 219/502, 518, 519, 506, 492; 99/329 R, 329 P, 333

[56] References Cited

U.S. PATENT DOCUMENTS

| | | | |
|---|---|---|---|
| 5,126,536 | 6/1992 | Devlin | 219/497 |
| 5,672,288 | 9/1997 | Tran | 219/502 |
| 5,751,215 | 5/1998 | Hall, Jr. | 340/584 |

*Primary Examiner*—Mark Paschall
*Attorney, Agent, or Firm*—Young & Thompson

[57] ABSTRACT

An electric toaster comprises an infrared detector (6) directed toward a heating device for the toaster, and a control device for the supply of electricity to the heating elements which is subordinated to a device (10) for measuring the radiation received by the detector, and which comprises a device (12) for processing the signal emitted by the detector. A comparator (13) compares a signal (S) leaving the processing device (12) with a signal (N) emitted by an adjustment device (14) of the degree of toasting. The measuring device (10) comprises, between the processing device (12) and the comparator device (13), a device (16) for diverting the signal (S) whose control is directed by a timer (18) of short duration which re-establishes at the end of that short duration the passage of the signal (S) toward the comparator (13).

5 Claims, 2 Drawing Sheets

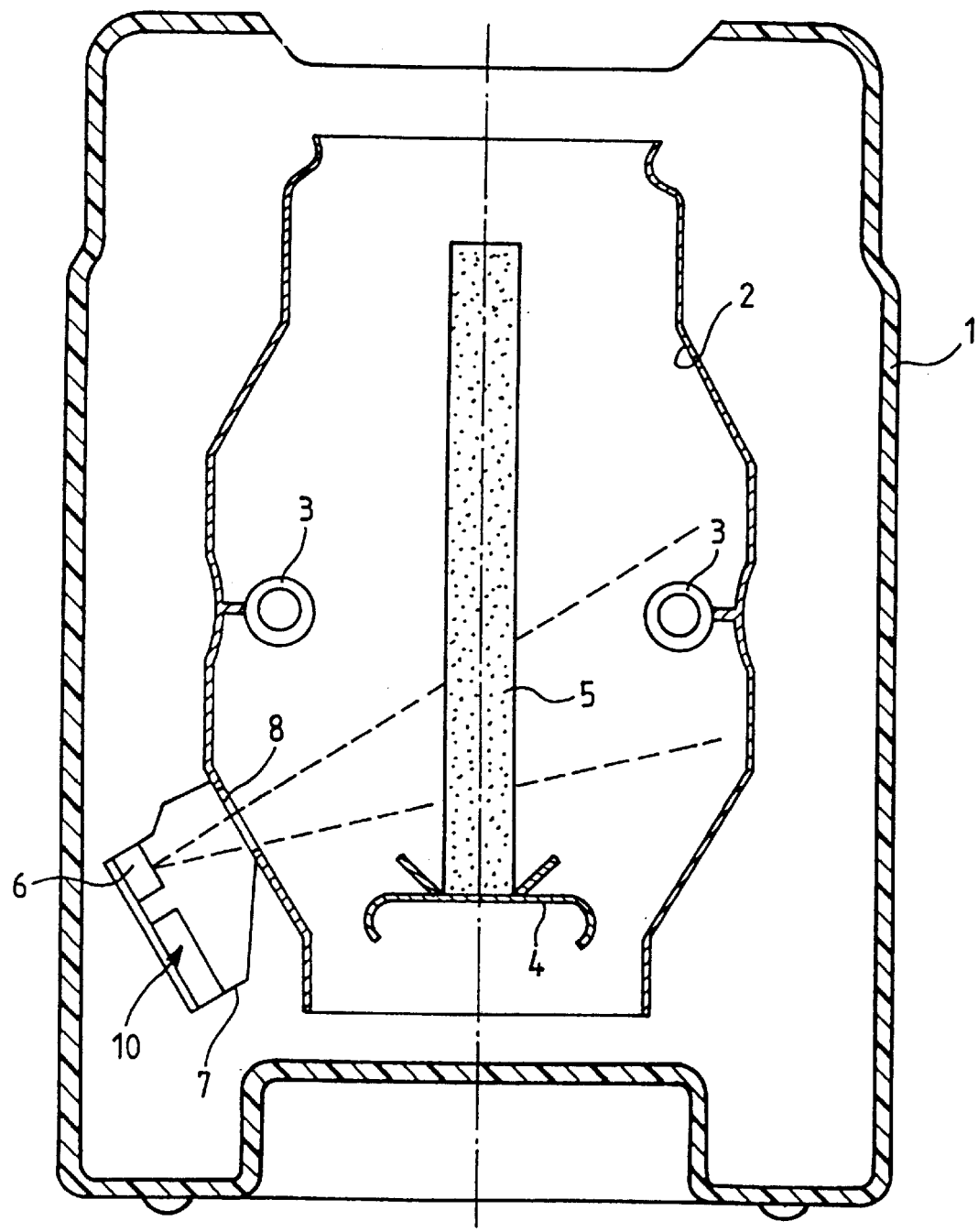
FIG_1

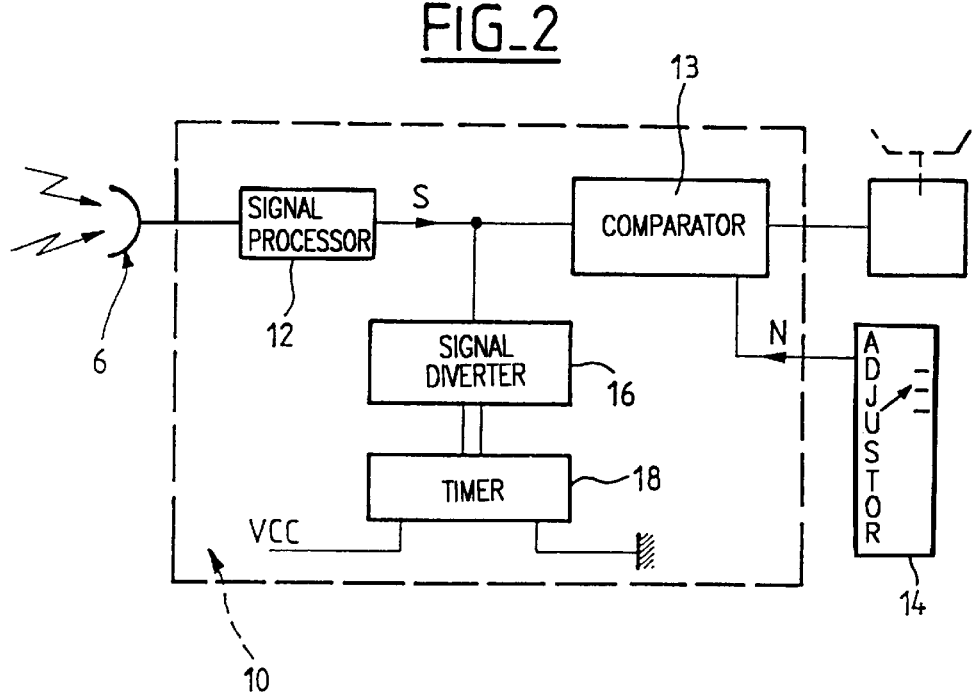
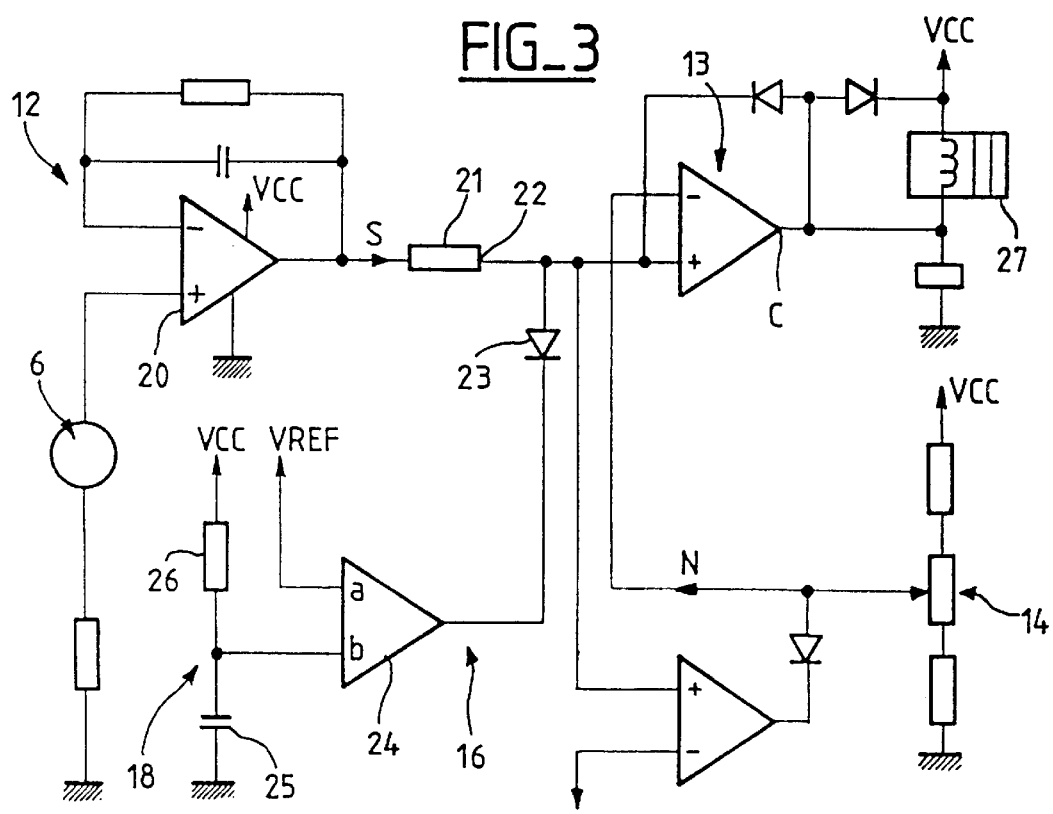

ELECTRIC TOASTER WITH INFRARED DETECTOR CROSS REFERENCE TO RELATED APPLICATION

This application corresponds to French application 97/09188 of Jul. 18, 1997, the disclosure of which is incorporated herein by reference.

FIELD OF THE INVENTION

The present invention relates to electric toasters comprising, in a housing, a toasting chamber provided with infrared radiative heating means located on opposite sides of a support for a body to be toasted, an infrared detector whose angle of vision is oriented toward one of said heating means, and a control device for the electrical supply of the heating means which is dependent on to a device for measuring radiation received by the detector, which is adapted to determine the temperature of the body to be toasted introduced into the chamber, and which comprises a means for processing the signal emitted by the detector, a means for comparing a signal (S) leaving the processing means with a signal (N) emitted by a means for adjusting the level of toasting.

BACKGROUND OF THE INVENTION

In toasters of this type, the measuring device as well as the detector must remain reliable over a long period of time no matter what the conditions of use. In the case in which the body to be toasted, for example a slice of bread, is correctly placed between the heating means and the detector, the measuring device ensures a normal toasting cycle and permits obtaining a degree of toasting selected by the user. By contrast, in the case of poor positioning of the body to be toasted, and even in the case of forgetting to insert this body into the toasting chamber, the detector receives directly the radiation emitted by one of said heating means and is hence blinded. This intense radiation is not only harmful to the electronic components of the detector, but also is seriously damaging to the measuring device if no operation of ceasing the radiation is taken promptly.

To overcome these defects, it has been provided either to place movable shutters in front of the detector, or to increase the sensitivity of the measuring device so as to obtain instantaneous stopping of the supply control device in case of blinding the detector. The first solution is too costly and difficult to use. As to the second solution, it causes the user to make a mistake, because he believes, when the body to be toasted is improperly positioned, that the toaster will not operate because of the stopping of the supply and the starting of the operation of the toaster are consecutive during continuous toasting cycles.

SUMMARY OF THE INVENTION

The invention has for its object to overcome these drawbacks whilst obtaining safety of use of this type of toaster.

According to the invention, the measuring device comprises, between the processing means and the comparison means, a means for diverting the signal (S) whose control is monitored by short duration timing means which establishes at the end of said duration the passage of the signal (S) toward the comparison means.

Thus, in the absence of or in the case of poor positioning of the body to be toasted, the measuring device rapidly disconnects the heating means but with a slight delay due to the operation and the duration of the timing means, thereby ensuring the protection of the detector and of the measuring device and preventing, in the second instance, poor toasting because the detector measures only the small reflected radiation but rather the direct radiation. Moreover, after this delay, the attention of the user is drawn by the cutoff of the heating means and can react immediately, either to place a slice of bread in the chamber, or correctly to position this slice of bread to obtain normal operation.

BRIEF DESCRIPTION OF THE DRAWINGS

The characteristics and advantages of the invention will become apparent from the description which follows, given by way of non-limiting example, with reference to the accompanying drawings, in which:

FIG. 1 shows schematically a toaster comprising a detector and a measuring device according to the invention;

FIG. 2 shows a block diagram of the detector and of the measuring device according to the invention;

FIG. 3 is an electronic circuit diagram of an embodiment of the invention.

DETAILED DESCRIPTION OF THE INVENTION

As shown in FIG. 1, the toaster comprises a housing 1, a toasting chamber 2 provided with infrared radiation heating means 3, located on opposite sides of a support 4 for a body 5 to be toasted and constituted respectively for example by a quartz tube comprising a resistance wire. The tubes are arranged in a symmetrical manner relative to the support 4 which is, in the present case, a food carrying carriage mounted vertically movably in known manner per se in the toasting chamber.

Between the housing and the chamber 2 is arranged an infrared detector 6 whose angle of vision indicated schematically by broken lines is oriented toward one of said heating means 3, which is to say toward an opposite one of the quartz tubes. In the exemplified embodiment, the detector 6 is of the thermopile type and is mounted on a support 7, at a distance from the wall of the chamber; its sensitive part being located facing a hole 8 provided in said chamber wall. Thus, the detector can receive the radiation reflected from the quartz tube emanating from the body to be toasted.

The toaster comprises in a manner known per se a control device for the electrical supply of the heating means which is subordinated to a measuring device 10 of the radiation received by the detector 2 and adapted to determine the temperature of the body to be toasted introduced into the chamber.

The measuring device also comprises a means 12 for processing the signal emitted by the detector, and a means 13 for comparing a signal (S) leaving the processing means 12, with a signal (N) emitted by a means 14 for manually adjusting the level of toasting.

According to the invention, the measuring means 10 comprises, between the processing means 12 and the comparator means 13, a means 16 for diverting the signal (S) whose control is monitored by a timing means 18 of a fixed short duration which re-establishes, at the end of said duration, the passage of the signal (S) toward the comparator means 13.

Moreover, to take account of the state of use of the toaster, either a first condition corresponding to a first use and hence starting from ambient temperature, or a second condition corresponding to successive toasting cycles at intermediate chamber temperatures of about 90° C., the invention provides that the timing means 18 will have two values of short duration, as functions of the state of use of the toaster. Thus, in the first state, the value of the time duration is fixed within a range of 10–12 seconds, whilst in the second state, this value is of the order of 3 seconds.

Thanks to the invention, in its first state starting cold, and in the case in which, for example, the slice of bread is not situated facing the detector 6, the timing means 18 will not re-establish the passage of the signal (S) toward the comparator means 13 until at the end of the lapse of 10 to 12 seconds, which comparator receiving the signal (S) higher than the signal (N) of the toasting level, will permit the control device for electrical supply to stop immediately the supply of the heating means 3.

The invention is particularly interesting in the case in which the toaster is in its second state because, instead of the comparator 13 failing to intervene immediately with the control device to stop the supply of the heating means, the timing means 18 introduces a delay of 3 seconds, which delay notifies the user that his toaster is not out of operation and which permits him thus to overcome the defect in emplacement of the body to be toasted.

By way of example, and referring to FIG. 3, in which the same reference numerals were used to designate the same portions of the invention, the electronic circuit diagram comprises an infrared detector 6 connected to a means 12 for processing the signal, comprising an operational amplifier 20 whose output is connected to a resistance 21. The output 22 of this resistance is connected, on the one hand, to a branch leading to a comparator means 13 and, on the other hand, to the diverter means 16 constituted by a diode 23 and an operational amplifier of the LM 324 type of which one stage is mounted in comparator 24 whose two outputs a, b are connected respectively to a reference voltage (VREF) and to a branch comprising the timing means 18 constituted by a condenser 25 and a load resistance 26 connected to a supply voltage VCC. The comparator means 13 is constituted by an operational amplifier stage LM 324 whose output C is connected to a control device for the electrical supply. In this embodiment, this device comprises in a manner known per se an electromagnet 27 which is adapted to release the support 4 and to open the supply conduits (not shown) at the end of the toasting cycle, the supply of this electromagnet being directed by the comparator 13.

The operation of the circuit described above will be explained for the case in which the toaster is in its second state, which is to say having an intermediate chamber temperature of 90° C. and a quartz tube temperature adjacent 600° C., and in which the body to be toasted (a slice of bread) is poorly positioned in or absent from the toasting chamber. As a result, when the toaster is started for a new toasting cycle, the detector 6 receives the maximum radiation from the quartz tube and the signal (S) at the output of the amplifier 20 is derived by the diode 23 on the comparator stage 24. The condenser 25 is charged to the voltage VCC over the duration of 3 seconds because it was already at VCC/2 after its preceding discharge. The comparator stage thus no longer causes a short circuit and re-establishes the passage of the signal (S) toward the positive input of the comparator means 13. The output C of this comparator is thus at the same potential VCC as that of the electromagnet. Because of this, the electromagnet is no longer supplied and releases the support 4 whilst simultaneously cutting the electrical supply of the quartz tubes.

What is claimed is:

1. In an electric toaster comprising a housing (1), and in the housing a toasting chamber (2) having infrared radiation heating means (3) located on opposite sides of a support (4) for a body to be toasted, an infrared detector (6) whose angle of vision is oriented toward one of said heating means, and a control device for electrical supply of the heating means, said control device being dependent on a measuring device (10) for measuring radiation received by the detector, thereby to determine the temperature of the body to be toasted introduced into the chamber, means (12) for processing a signal emitted by the detector, comparator means (13) for comparing a first signal (S) leaving the processing means (12) with a second signal (N) emitted by an adjustment means (14) of the degree of toasting; the improvement wherein the measuring device (10) comprises, between the processing means (12) and the comparator means (13), a signal diverter means (16) operatively connected for diverting the first signal (S) whose control is monitored by a timing means (18) of short duration which re-establishes at the end of said duration the passage of the first signal (S) toward the comparator means (13).

2. Toaster according to claim 1, wherein the detector is of the thermopile type.

3. Toaster according to claim 1, wherein the timing means (18) has two values of short duration which are temperature dependent and representative of the state of use of the toaster.

4. Toaster according to claim 3, wherein, in a first said state, the value of the timing duration is fixed within the range of 10–12 seconds, whilst in a second state corresponding to successive cycles of toasting, the value of the duration of timing is about 3 seconds.

5. Toaster according to claim 1, wherein the means (12) for processing the signal comprises an operational amplifier (20) whose output is connected to a resistance (21) connected to a branch leading to the comparator means (13), and to the signal diverter means (16) constituted by a diode (23) and an operational amplifier whose one stage (24) is mounted in the comparator means and connected to the timing means (18), said comparator means (13) being also formed by a stage of said operational amplifier and whose output (C) is connected to the control device for the electrical supply comprising an electromagnet adapted to open supply contacts.

* * * * *